United States Patent [19]

Bömer et al.

[11] Patent Number: 4,737,549

[45] Date of Patent: Apr. 12, 1988

[54] TERPOLYMERS OF MALEIC ACID ANHYDRIDE, (METH)ACRYLIC ACID, AND (METH)ACRYLONITRILE

[75] Inventors: Bruno Bömer; Franz Schade, both of Bergisch-Gladbach, Fed. Rep. of Germany

[73] Assignee: Bayer Aktiengesellschaft, Leverkusen, Fed. Rep. of Germany

[21] Appl. No.: 892,537

[22] Filed: Aug. 1, 1986

[30] Foreign Application Priority Data

Aug. 16, 1985 [DE] Fed. Rep. of Germany ....... 3529248

[51] Int. Cl.$^4$ .......................... C08C 37/00; C08K 5/16; C08F 130/08; C08F 120/68
[52] U.S. Cl. .............................. 525/327.8; 524/186; 524/236; 524/253; 524/401; 524/811; 524/833; 526/317.1; 526/318.2; 526/271; 8/94.19 R; 525/330.2; 525/378; 525/379; 525/380; 525/381; 525/382
[58] Field of Search .................. 526/271, 317.1, 318.2, 526/317.1, 318.2; 524/263, 186, 236, 253, 401, 811, 833; 525/327.8

[56] References Cited

U.S. PATENT DOCUMENTS

| | | | |
|---|---|---|---|
| 2,205,882 | 6/1940 | Graves | 526/317.1 |
| 2,873,211 | 2/1959 | Roser et al. | 526/271 |
| 4,387,191 | 6/1983 | Dufour et al. | 526/271 |

Primary Examiner—Joseph L. Schofer
Assistant Examiner—Peter F. Kulkosky
Attorney, Agent, or Firm—Sprung Horn Kramer & Woods

[57] ABSTRACT

Terpolymers of 30 to 75% by weight of maleic acid (anhydride), 5 to 60% by weight of (meth)acrylic acid and 5 to 40% by weight of (meth)acrylonitrile are suitable as retanning agents for mineral-tanned leather.

7 Claims, No Drawings

TERPOLYMERS OF MALEIC ACID ANHYDRIDE, (METH)ACRYLIC ACID, AND (METH)ACRYLONITRILE

The invention relates to terpolymers of 30 to 75% by weight of maleic acid (anhydride), 5 to 60% by weight of (meth)acrylic acid and 5 to 40% by weight of (meth)acrylonitrile, their preparation and their use as retanning agents for mineral-tanned leather as well as agents containing them.

A large number of polymers and oligomers containing carboxyl groups have already been used as auxiliaries in tanning processes.

Thus, U.S. Pat. specification Nos. 2,205,882 and 2,205,883 describe the use of polyacrylic acid, of copolymers of acrylic and methacrylic acid, of styrene/maleic anhydride copolymers, of polymethacrylic acid, of partly hydrolysed polymethyl methacrylate and of copolymers of methacrylic acid with styrene or methyl methacrylate for tanning leather.

German Offenlegungsschrift No. 2,033,973 describes a process for plumping leather in which aqueous solutions of optionally substituted homo- or copolymeric acrylic acids are used together with glutin size.

The alkali metal salts of polymers and/or copolymers which contain carboxyl groups and are derived from acrylic acid, methacrylic acid, maleic acid, vinyl alcohol, propenol or hydroxyacrylic acid are claimed as neutralizing agents for chrome-tanned hides in German Offenlegungsschrift No. 3,005,699.

European Pat. No. A-118,213 describes the tanning of leather with copolymers which contain at least 60 mol % of methacrylic acid units and at least 5 mol % of units of at least one ($C_1$–$C_4$)-alkyl acrylate and have a weight-average molecular weight of 3,500 to 9,000.

German Offenlegungsschrift No. 3,248,485 describes a process for retanning leather in which polymers which consist to the extent of at least 10% by weight of the polymer of (meth)-acrylic acid radicals neutralized with aliphatic amines are used.

Acrylic-based oligomers which have been prepared with the aid of sulphites or bisulphites and have molecular weights of less than 14,000 are claimed in European Pat. No. A-61,420 as retanning agents for chrome-tanned leather. The "oligomers" which are particularly suitable as tanning agents can contain structural elements of (meth)acrylonitrile, (meth)acrylamide, N-substituted (meth)acrylamides, (meth)acrylic acid esters and (meth)acrylic acid and vinyl esters. Method A of European Pat. No. A-61,420 has been reproduced as Comparison Example A.

It has now been found, surprisingly, that leathers which are distinguished by a soft handle and a light colour are obtained by retanning mineral-tanned, in particular chrome-tanned, leather with the terpolymers according to the invention. A soft leather is thereby obtained even if treatment with softening and fat liquoring agents is omitted.

In contrast, the leather obtained by retanning with known polymers containing carboxyl groups dry as hard and firm leathers, without the colour of the leather being brightened, if they are not additionally treated with softening or fat liquoring agents.

The terpolymers according to the invention are preferably used in the form of their completely or partly neutralized aqueous solutions or dispersions.

Any desired alkaline substances can be used for the neutralization. Alkali metal hydroxides, ammonia and (hydroxy)-alkylamines, for example those of the formula

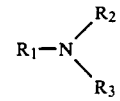

wherein
$R_1$, $R_2$ and $R_3$ denote $C_1$–$C_6$-alkyl or $C_2$–$C_6$-alkyl which is substituted by OH, $NH_2$ or mono- or di-$C_1$–$C_4$alkylamino and
$R_1$ and $R_2$ furthermore denote hydrogen,
are preferred.

Ammonia is especially preferably used.

Preferred solutions or dispersions contain terpolymers of 40 to 70% by weight of maleic acid (anhydride), 10 to 50% by weight of (meth)acrylic acid and 9 to 40% by weight of (meth)acrylonitrile. Of these terpolymers, those which contain acrylic acid and acrylonitrile are to be singled out.

Terpolymers which have been prepared from 45 to 65% by weight of maleic acid, 15 to 40% by weight of acrylic acid and 15 to 35% by weight of acrylonitrile are particularly preferred because of their water-solubility and retanning action.

The ready-to-use solutions preferably have a pH of between 3.5 and 7.0 and in particular between 4.5 and 5.5. If the terpolymers are soluble in water to give a clear solution, their 40% strength by weight aqueous solutions have solution viscosities of between 5 mPas and 10,000 mPas, preferably between 10 and 3,000 mPas and particularly preferably between 30 and 1,500 mPas, at pH values of between 3.5 and 7.0.

The terpolymers according to the invention can be prepared by the free radical polymerization processes which are known per se. Examples of suitable processes are precipitation polymerization, in which the monomers are dissolved in an agent which precipitates the polymer and the polymer formed is precipitated, or solution polymerization. The use of water as the polymerization medium is particularly preferred. Acrylonitrile-rich terpolymers are insoluble in water, or only soluble under the influence of heat, in the form of the free acids. However, on partial or complete neutralization, they dissolve substantially and usually completely. Suitable initiators for triggering off the polymerization are the customary agents which form free radicals. Examples which may be mentioned are: diacyl peroxides, such as dibenzoyl peroxide, peresters, such as tert.-butyl perpivalate, aliphatic azo compounds, such as azoisobutyronitrile, azo-4-cyanopentanoic acid or other water-soluble aliphatic azo compounds, salts of peroxodisulphuric acid or hydrogen peroxide. If water is used as the polymerization medium, initiators which are at least partly soluble in water, such as azoisobutyronitrile, azo-4-cyanopentanoic acid, peroxodisulphates or hydrogen peroxide, optionally in combination with suitable redox components, are preferred. The polymerization temperature depends on the nature of the initiators employed and can be, for example, between 20° and 120° C., preferably between 50° and 110° C.

The solution viscosity can be established by the amount of the initiator, which is preferably between 1 and 10% by weight, based on the monomer, when ammonium persulphate is used at a polymerization temperature of 80° to 90° C., and if appropriate by additionally using substances which regulate the molecular weight, such as mercapto compounds. The polymerization is particularly preferably carried out in an aqueous medium by a feed process.

The terpolymers according to the invention can be used for retanning mineral-tanned leathers of the most diverse types, such as shoe upper, furniture and clothing leather, both by themselves or in combination with other synthetic organic tanning agents, resin tanning agents and vegetable tanning agents. They are particularly suitable for producing soft types of leather, such as Softy and Nappa leather or corresponding white leather.

Retanning is carried out by processes which are customary in practice. The amount of the terpolymers used is preferably 2 to 8% by weight, based on the shaved weight of the mineral leather.

PREPARATION

Demineralized water was used in the following examples. The viscosities of the solutions or dispersions were measured with a rotary viscometer RV 12 from Haake, Berlin, with measurement device MVE II. The solutions have no or only very little structural viscosity.

EXAMPLE 1

160 ml of water are initially taken in a 2 l stirring apparatus with a VA blade stirrer. The apparatus is flushed with $N_2$ and the initial contents are warmed to 90° C. 288 g of maleic anhydride are dissolved in 320 g of water at about 40° C. under hydrolysis (→341 g of maleic acid≐64% by weight). After cooling to about 30° C., 72 g (≐13.5% by weight) of acrylic acid and 120 g (≐22.5% by weight) of acrylonitrile are added. An initiator solution is prepared from 36 g of ammonium persulphate and 164 g of water. The two solutions are not degassed. The monomer solution is added dropwise in the course of 3 hours and the initiator solution is simultaneously added dropwise in the course of 4 hours at 90° C. After addition of the initiator solution, the mixture is subsequently stirred under reflux for 2 hours. 150 ml of water are then distilled off under normal pressure. The pH is brought to 4.5 by addition of 215 g of 25% strength aqueous ammonia solution. 1,216 g of a polymer solution with a solids content of 45.4% by weight and a solution viscosity of 48 mPas at 25° C. are obtained.

EXAMPLE 2

200 ml of water are initially taken in the apparatus of Example 1 and are degassed and warmed to 80° C. 360 g of maleic anhydride are dissolved in 360 ml of water, under hydrolysis (→426 g of maleic acid≐58.5% by weight). After the solution has been cooled to about 30° C., 165 g of acrylic acid (≐23% by weight) and 135 g of acrylonitrile (≐18.5% by weight) are added. An initiator solution is prepared from 45 g of ammonium persulphate and 205 g of water. The two solutions are not degassed. The monomer solution is added dropwise in the course of 3 hours and the initiator solution is simultaneously added dropwise in the course of 4 hours at an internal temperature of 80° C. After addition of the initiator solution, the mixture is subsequently stirred at 85° C. for 1 hour, at 90° C. for 1 hour and under reflux for 2 hours. 100 ml of water are distilled off under normal pressure and are replaced by 100 ml of fresh water. The pH is brought to 3.5 by addition of 250 g of 25% strength aqueous ammonia solution. 1,696 g of polymer solution with a solids content of 45.4% by weight and a solution viscosity of 107 mPas at 25° C. are obtained.

EXAMPLE 3

Example 2 is repeated with a monomer solution of 300 g of maleic anhydride (→355 g of maleic acid ≐54% by weight), 300 g of water, 180 g of acrylic acid (≐27.5% by weight) and 120 g of acrylonitrile (≐18.5% by weight). After addition of 210 g of 25% strength aqueous ammonia solution, 1,550 g of polymer solution with a pH value of 3.5, a solids content of 46.3% by weight and a solution viscosity of 215 mPas at 25° C. are obtained.

EXAMPLE 4

160 ml of water are initially taken in the apparatus from Example 1 and are degassed and warmed to 80° C. 240 g of maleic anhydride are dissolved in 320 ml of water at about 40° C., under hydrolysis (→284 g of maleic acid=54% by weight), and 96 g of acrylic acid (≐18.5% by weight) and 144 g of acrylonitrile (≐27.5% by weight) are then added at about 30° C. The initiator solution is prepared from 12 g of ammonium persulphate and 250 g of water. The two solutions are not degassed and are metered in at 80° C. as in Example 2, and the polymerization is brought to completion. After 100 ml of water have been distilled off and replaced, the pH is brought to 4.7 by addition of 225 g of 25% strength aqueous ammonia solution. 1,267 g of a terpolymer solution containing 41.5% by weight of solids and with a solution viscosity of 344 mPas are obtained.

EXAMPLES 5–7

In each case 200 ml of water are initially taken in a 2 l stirred apparatus with a VA blade stirrer and are degassed and heated to the boiling point under nitrogen. The monomer solutions with the composition shown in the table are prepared as in Example 1, and are not degassed and are added dropwise to the boiling initial mixture in the course of 2 hours. An initiator solution of 15 g of ammonium persulphate in 235 g of water is simultaneously pumped in through a glass capillary below the level of the liquid. The mixture is subsequently stirred under reflux for one hour and the pH is then brought to 3.5 with 25% strength aqueous ammonia solution.

| Example | | 5 | 6 | 7 |
| --- | --- | --- | --- | --- |
| Maleic anhydride | [g] | 240 | 240 | 240 |
| = maleic acid | [g] | 284 | 284 | 284 |
| = maleic acid | [% by weight] | 44 | 44 | 44 |
| Water | [g] | 300 | 300 | 300 |
| Acrylic acid | [g] | 180 | 240 | 300 |
| ≐ acrylic acid | [% by weight] | 28 | 37 | 46.5 |
| Acrylonitrile | [g] | 180 | 120 | 60 |
| ≐ acrylonitrile | [% by weight] | 28 | 19 | 9.5 |
| 25% strength ammonia solution | [g] | 169 | 196 | 217 |
| Yield of terpolymer solution | [g] | 1489 | 1509 | 1514 |
| Solids content | [% by weight] | 42.3 | 40.4 | 40.1 |
| Solution viscosity at 25° C. | [mPas] | 717 | 717 | 1266 |

COMPARISON EXAMPLE A

Method A of European Pat. No. A-61,420 is reproduced, the internal temperature during the polymerization being kept at the prescribed temperature by cooling with ice. The solution of the resulting copolymer of 57.5% by weight of acrylic acid and 42.5% by weight of acrylonitrile has, at pH 6, a solids content of 38% by weight and a viscosity of 2,085 mPas at 25° C.

Use

In the following examples—unless otherwise indicated—all the percentage data relate to the shaved weight of the chrome leather.

In the following retanning processes, including the pretreatments, in each case cowhide sections which have been chrome-tanned in the manner customary in practice and shaved to a thickness of 1.6 to 1.8 mm are subjected to rotary milling in a tanning vat with the following additives. For changing the liquor and for adding chemicals and tanning agents, the tanning vat is in each case stopped for a short time.

| | Running time |
|---|---|
| 1. Washing: | |
| 200% of water at 50° C. | 10 minutes |
| 0.2% of nonylphenol ethoxylated with 15 moles of ethylene oxide | |
| Drain off the liquor. | |
| 2. Neutralization: | |
| 100% of water at 40° C. | 40 minutes |
| 0.5% of calcium formate | |
| 0.2% of sodium bicarbonate | |
| pH of the liquor about 4.4 | |
| Strengthen with 0.05 to 1% of sodium bicarbonate as required | 10 minutes |
| Drain off the liquor. | |
| 3. Retanning: | |
| 100% of water at 50° C. | 60 minutes |
| 2.5% of solid of a polymer solution prepared according to Examples 1 to 7 or A, diluted 1:10 with water. | |
| pH of the liquor at the end of the retanning 3.7 to 4.5. | |
| 4. Washing: | |
| 200% of water at 50° C. | 10 minutes |
| Drain off the liquor and rinse the leather in cold running water for 5 minutes. | |
| Hang the leather to dry overnight. | |

The resulting leathers have the properties shown in the following table.

The numerical values under softness/handle denote grades of 1=soft and with a good handle to 5=hard and rough like leather dried without retanning.

In the case of the white effect, 1=significantly brightened leather colour and 5=no brightening, like leather dried without retanning. This evaluation is based on several retanning series carried out independently of one another with the same product selection.

For comparison, in each case a chrome leather section which has received no treatment with a retanning agent but has otherwise been treated like the other experimental leather is used.

TABLE

| Retanning with terpolymer from Example | Softness/handle | Brightening |
|---|---|---|
| 1 | 3 | 2 |
| 2 | 2–3 | 1–2 |
| 3 | 2 | 1–2 |
| 4 | 2 | 1–2 |
| 5 | 2 | 2 |
| 6 | 3 | 2 |
| 7 | 3 | 3 |
| A | 5 | 5 |
| without polymer retanning | 5 | 5 |

From this it follows that the softness and handle and the brightening in the colour of the leather of chrome leather retanned with the copolymer from Comparison Example A differs only insignificantly from comparison leather without retanning. In contrast, the leather retanned with terpolymers according to Examples 1 to 7 is significantly better in softness and handle as well as brightening effect or white effect.

What is claimed is:

1. A terpolymer consisting essentially of 30 to 75% by weight of maleic acid or maleic acid anhydride, 5 to 60% by weight of (meth)acrylic acid and 5 to 40% by weight of (meth)acrylonitrile.

2. A terpolymer according to claim 1 of 45 to 65% by weight of maleic acid, 15 to 40% by weight of acrylic acid and 15 to 35% by weight of acrylonitrile.

3. A terpolymer according to claim 1 wherein the terpolymer is in the form of a completely or partly neutralized aqueous solution or suspension.

4. A terpolymer according to claim 3, wherein the terpolymer is completely or partially neutralized with an alkali metal hydroxide, ammonia or an amine of the formula

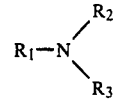

wherein
R$_1$, R$_2$ and R$_3$ deonote C$_1$–C$_6$-alkyl or C$_2$–C$_6$-alkyl which is substituted by OH, NH$_2$ or mono- or di-C$_1$–C$_4$alkylamino and
R$_1$ and R$_2$ also denote hydrogen.

5. A terpolymer according to claim 3, wherein the aqueous solution or suspension has a pH, established with ammonia, of between 3.5 and 7.0.

6. A process for the preparation of the terpolymers according to claim 1, comprising polymerization of a monomer mixture comprising 30 to 75% by weight of maleic acid or maleic acid anhydride, 5 to 60% by weight of (meth)acrylic acid and 5 to 40% by weight of (meth)acrylonitrile.

7. A process according to claim 6, wherein the free radical polymerization is carried out in an aqueous medium by a feed process.

* * * * *